US009136079B2

(12) United States Patent
Carlino et al.

(10) Patent No.: US 9,136,079 B2
(45) Date of Patent: Sep. 15, 2015

(54) ELECTRONIC TRIP UNIT, CIRCUIT INTERRUPTER INCLUDING THE SAME, AND METHOD OF SETTING TRIP UNIT SETTINGS

(71) Applicant: EATON CORPORATION, Cleveland, OH (US)

(72) Inventors: Harry J. Carlino, Export, PA (US); David R. Rohn, Venetia, PA (US); Jon E. Hymel, Coraopolis, PA (US)

(73) Assignee: EATON CORPORATION, Cleveland, OH (US)

(*) Notice: Subject to any disclaimer, the term of this patent is extended or adjusted under 35 U.S.C. 154(b) by 291 days.

(21) Appl. No.: 13/837,696

(22) Filed: Mar. 15, 2013

(65) Prior Publication Data

US 2014/0266519 A1    Sep. 18, 2014

(51) Int. Cl.
| | |
|---|---|
| *H01H 75/00* | (2006.01) |
| *H01H 77/00* | (2006.01) |
| *H01H 83/00* | (2006.01) |
| *H01H 47/00* | (2006.01) |
| *H01H 45/08* | (2006.01) |
| *H02H 3/00* | (2006.01) |
| *H01H 71/00* | (2006.01) |

(52) U.S. Cl.
CPC ............ *H01H 47/001* (2013.01); *H01H 45/08* (2013.01); *H02H 3/006* (2013.01); *H01H 2071/006* (2013.01)

(58) Field of Classification Search
CPC ............... H01H 47/001; H01H 45/08; H01H 2071/006; H02H 3/006

USPC ................. 335/7, 205–207; 200/11 R, 296; 361/93.1, 93.2
See application file for complete search history.

(56) References Cited

U.S. PATENT DOCUMENTS

| | | | |
|---|---|---|---|
| 4,428,022 A |  | 1/1984 | Engel et al. |
| 5,019,956 A | * | 5/1991 | Nakayama et al. ............. 363/50 |
| 5,525,985 A |  | 6/1996 | Schlotterer et al. |
| 5,910,760 A |  | 6/1999 | Malingowski et al. |
| 5,943,201 A |  | 8/1999 | Walker et al. |

(Continued)

FOREIGN PATENT DOCUMENTS

DE        198 11 956 A1    9/1999

OTHER PUBLICATIONS

European Patent Office, "International Search Report and Written Opinion", Mar. 24, 2014, 10 pp.

*Primary Examiner* — Bernard Rojas
(74) *Attorney, Agent, or Firm* — Eckert Seamans Cherin & Mellott, LLC; Nathaniel C. Wilks

(57) ABSTRACT

An electronic trip unit having a number of trip unit settings includes: a first input member; a second input member; a multi-position selector configured to select one of plurality of positions corresponding to values of the trip unit settings; a plurality of indicators each corresponding to one of the plurality of trip unit settings; and a processor having a routine, wherein the routine of the processor is structured to, in response to actuation of the first input member, increment a ring counter value and selectively activate one of the indicators corresponding to the ring counter value; and wherein the routine of the processor is further structured to, in response to actuation of the second input member, set a value of the trip unit setting corresponding to the activated indicator based on the selected position of the multi-position selector.

24 Claims, 3 Drawing Sheets

(56) References Cited

U.S. PATENT DOCUMENTS

| | | |
|---|---|---|
| 6,144,271 A | 11/2000 | Mueller et al. |
| 6,788,512 B2 * | 9/2004 | Vicente et al. ............... 361/93.1 |
| 6,894,478 B1 | 5/2005 | Fenske |
| 7,571,553 B2 * | 8/2009 | Joerger et al. ................... 34/378 |
| 7,948,343 B2 | 5/2011 | Carlino et al. |
| 8,023,238 B2 * | 9/2011 | Vicente et al. ............... 361/93.2 |
| 8,558,650 B2 * | 10/2013 | Paek ............................. 335/172 |
| 2003/0024796 A1 * | 2/2003 | Peterson et al. ............ 200/11 R |
| 2005/0047045 A1 | 3/2005 | Puskal et al. |
| 2008/0013238 A1 * | 1/2008 | Colsch et al. ................ 361/93.2 |
| 2009/0154046 A1 | 6/2009 | Robinson et al. |
| 2009/0195337 A1 | 8/2009 | Carlino et al. |

* cited by examiner

ELECTRONIC TRIP UNIT, CIRCUIT INTERRUPTER INCLUDING THE SAME, AND METHOD OF SETTING TRIP UNIT SETTINGS

BACKGROUND

1. Field

The disclosed concept relates generally to electronic trip units, and in particular, to electronic trip unit interfaces operable to program settings of electronic trip units. The disclosed concept also relates to circuit interrupters including an electronic trip unit. The disclosed concept further relates to methods of setting trip unit settings of electronic trip units.

2. Background Information

Circuit interrupters, such as circuit breakers, are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Industrial circuit breakers often use a circuit breaker frame, which houses a trip unit. See, for example, U.S. Pat. Nos. 5,910,760 and 6,144,271. The trip unit may be modular and may be replaced, in order to alter the electrical properties of the circuit breaker.

It is well known to employ trip units which utilize a microprocessor to detect various types of overcurrent trip conditions and provide various protection functions, such as, for example, a long delay trip, a short delay trip, an instantaneous trip, and/or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

The earliest electronic trip unit circuit designs utilized discrete components such as transistors, resistors and capacitors.

More recently, designs, such as disclosed in U.S. Pat. No. 4,428,022; and U.S. Pat. No. 5,525,985, have included microprocessors, which provide improved performance and flexibility. These digital systems sample the current waveforms periodically to generate a digital representation of the current. The microprocessor uses the samples to execute algorithms, which implement one or more current protection curves.

Electronic trip units have various settings which can be adjusted to change the behavior of the electronic trip unit. Several known electronic trip units include an interface panel which is used to adjust the settings of the electronic trip unit. One known electronic trip unit includes an interface panel having five rotary switches, two light emitting diodes ("LEDs"), and one test port which are used to adjust the settings of the electronic trip unit. Additionally, an external module is required to read cause of trip information from the electronic trip unit. However, each component on the electronic trip unit interface panel, as well as the external module, increase the cost of the electronic trip unit.

There is room for improvement in electronic trip units.

There is also room for improvement in circuit interrupters.

There is also room for improvement in methods of setting trip unit settings of electronic trip units.

SUMMARY

These needs and others are met by embodiments of the disclosed concept, which provide an electronic trip unit having a first input member, a second input member, a multi-position selector, and a plurality of indicators. These needs and others are also met by embodiments of the disclosed concept, which provide a circuit interrupter having separable contacts, an operating mechanism, and an electronic trip unit including a first input member, a second input member, a multi-position selector, and a plurality of indicators. These needs and others are also met by embodiments of the disclosed concept, which provide a method of setting trip unit settings on an electronic trip unit having a first input member, a second input member, a multi-position selector, and a plurality of indicators.

In accordance with one aspect of the disclosed concept, an electronic trip unit having a plurality of trip unit settings comprises: a first input member; a second input member; a multi-position selector configured to select one of a plurality of positions corresponding to values of the trip unit settings; a plurality of indicators each corresponding to one of the number of trip unit settings; and a processor having a routine, wherein the routine of the processor is structured to, in response to actuation of the first input member, increment a ring counter value and selectively activate one of the indicators corresponding to the ring counter value; and wherein the routine of the processor is further structured to, in response to actuation of the second input member, set a value of the trip unit setting corresponding to the activated indicator based on the selected position of the multi-position selector.

As another aspect of the disclosed concept, a circuit interrupter configured to protect a power circuit comprises: separable contacts; an operating mechanism configured to open and close said separable contacts; an electronic trip unit cooperating with said operating mechanism to trip open the separable contacts and having a plurality of trip unit settings, the electronic trip unit comprising: a first input member; a second input member; a multi-position selector configured to select one of a plurality of positions corresponding to values of the trip unit settings; a plurality of indicators each corresponding to one of the trip unit settings; and a processor having a routine, wherein the routine of the processor is structured to, in response to actuation of the first input member, increment a ring counter value and selectively activate one of the indicators corresponding to the ring counter value; and wherein the routine of the processor is further structured to, in response to actuation of the second input member, set a value of the trip unit setting corresponding to the activated indicator based on the selected position of the multi-position selector.

As another aspect of the disclosed concept, a method of setting trip unit settings of an electronic trip unit having a first input member, a second member, a multi-position selector configured to select one of a plurality of positions corresponding to values of trip unit settings, and a plurality of indicators each corresponding to one of the trip unit settings comprises: in response to actuation of the first input member, incrementing a ring counter value and selectively activating one of the indicators corresponding to the ring counter value; and in response to actuation of the second input member, setting a value of the trip unit setting corresponding to the activated indicator based on the selected position of the multi-position selector.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
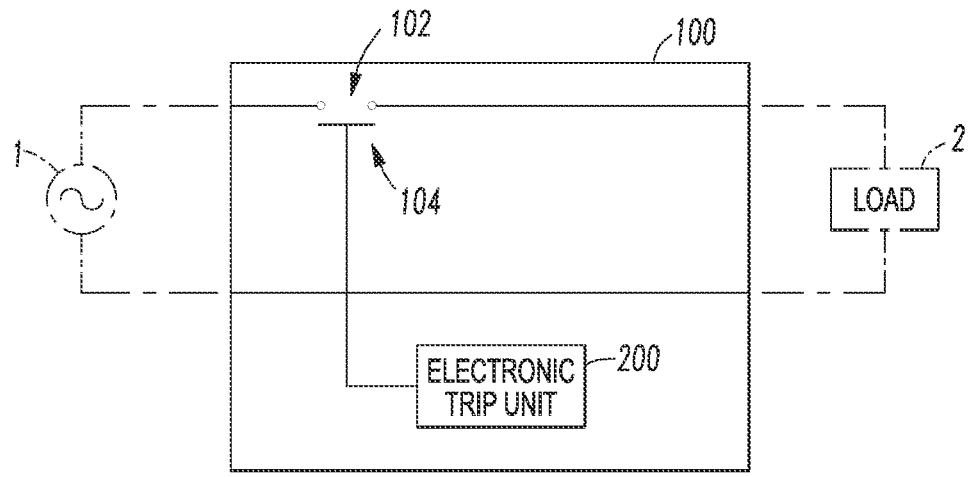
FIG. 1 is a schematic diagram in block form of a circuit interrupter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "ring counter" shall mean a counter which cyclically counts through its values. For example, once a ring counter reaches its last value, incrementing the ring counter again will cause the ring counter to begin counting again at its first value.

Referring to FIG. 1, a circuit interrupter 100 (e.g., without limitation, a circuit breaker), is shown. The circuit interrupter 100 is configured to protect a power circuit including a power source 1 and a load 2. The circuit interrupter 100 includes separable contacts 102, an operating mechanism 104 structured to open and close the separable contacts 102, and an electronic trip unit 200 which cooperates with the operating mechanism 104 to trip open the separable contacts 102.

The electronic trip unit 200 has a plurality of trip unit settings associated therewith (e.g., without limitation; full load ampere setting ("Ir"); long delay time ("LDT"); short delay pickup ("SDPU"); short delay time ("SD Time")) which can be adjusted to vary the functional behavior of the electronic trip unit 200.

Figure 2:
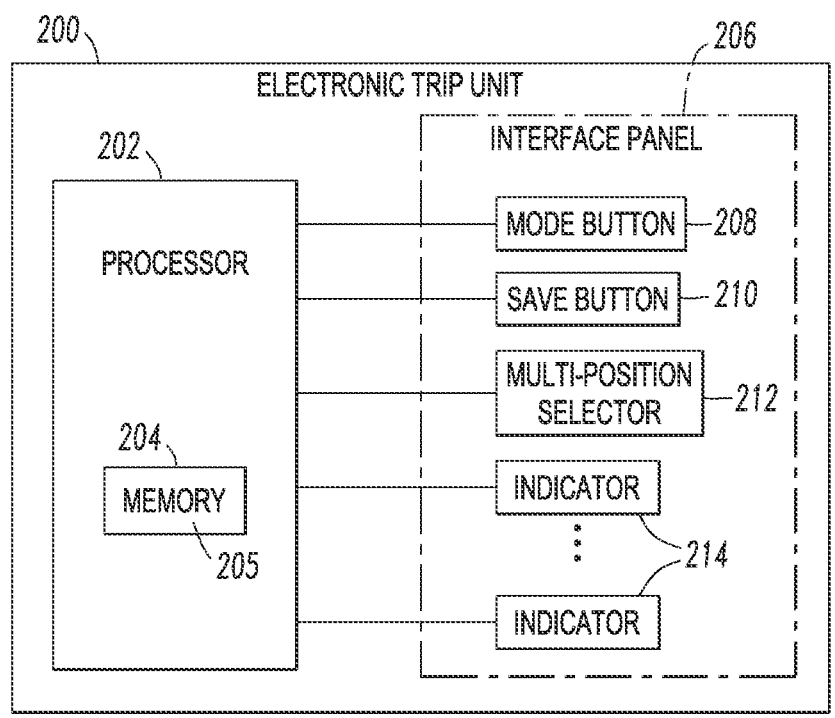
FIG. 2 is a schematic diagram in block form of an electronic trip unit in accordance with an example embodiment of the disclosed concept.

Referring to FIG. 2, the electronic trip unit 200 includes a processor 202 having a number of routines 205 and a memory 204. The memory 204 may be external to (not shown) or internal to (as shown) the processor 202. The number of routines 205 of the processor 202 may be stored by the memory 204 (as shown) or by another suitable memory (not shown).

Figure 3:
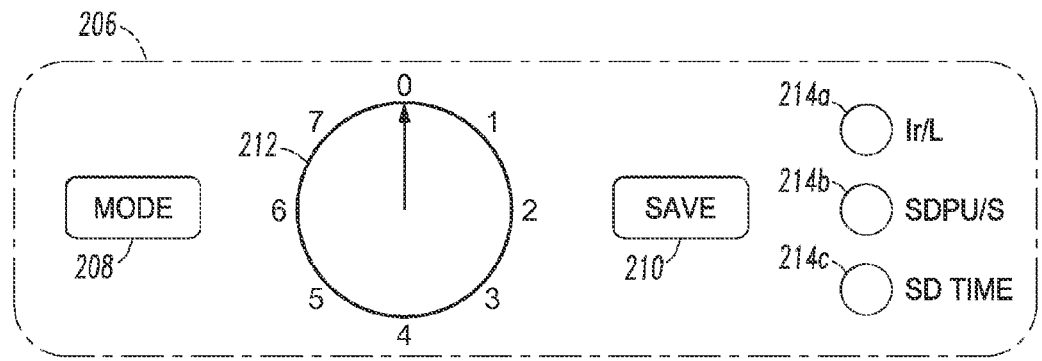
FIG. 3 is a front elevation view of an interface panel of the electronic trip unit of FIG. 1.
Figure 4:
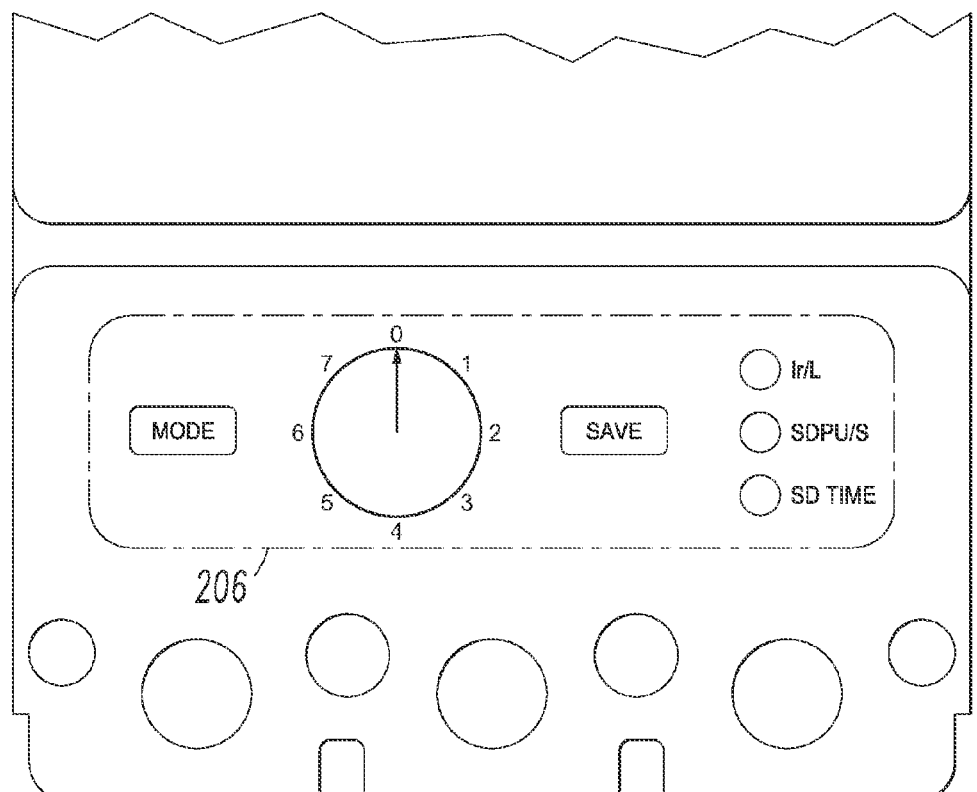
FIG. 4 is a front elevation view of the circuit interrupter including the electronic trip unit of FIG. 1.

The electronic trip unit 200 further includes an interface panel 206 having a first input member such as the example mode button 208, a second input member such as the example save button 210, a multi-position selector 212 (e.g., without limitation, a rotary dial switch), and a plurality of indicators 214 (e.g., without limitation, plural light emitting diodes) disposed thereon. An example layout of the interface panel 206 including first second, and third indicators 214a,214b, 214c is shown in FIG. 3 and an example of the interface panel 206 installed on the circuit interrupter 100 is shown in FIG. 4.

The multi-position selector 212 is configured to select one of a plurality of positions. Each position of the multi-position selector 212 corresponds to values of the trip unit settings. Table 1 shows an example of multi-position selector 212 positions and their corresponding values for Ir, SDPU, and SD Time trip unit settings. For example, as shown in Table 1, position "3" on the multi-position selector 212 corresponds to a value of 150 A for the Ir setting, a value of 5× for the SDPU setting, and a value of 120 ms for the SD Time setting. While Table 1 shows an example of multi-position selector 212 positions and their corresponding values, it will be appreciated by one having ordinary skill in the art that the plurality of multi-position selector 212 positions, the number and types of trip unit settings, and the values of the trip unit settings corresponding to each position of the multi-position selector 212 can be varied without departing from the scope of the disclosed concept.

TABLE 1

| Multi-Position Selector Position | Ir Value (A) | SDPU Value | SD Time Value (ms) |
|---|---|---|---|
| 0 | 100 | 2x | Inst. |
| 1 | 110 | 3x | Inst. |
| 2 | 125 | 4x | Inst. |
| 3 | 150 | 5x | 120 |
| 4 | 160 | 6x | 120 |
| 5 | 175 | 7x | 120 |
| 6 | 200 | 8x | 300 |
| 7 | 225 | 10x | 300 |

The indicators 214 each correspond to one trip unit setting. The example interface panel 206 shown in FIG. 3 includes first, second, and third indicators 214a,214b,214c corresponding to the Ir setting, the SDPU setting, and the SD Time setting, respectively. However, it will be appreciated by one having ordinary skill in the art that the number of indicators 214 and their corresponding trip unit settings can be varied without departing from the scope of the disclosed concept.

One or more of the indicators 214 can also each correspond to a cause of trip (e.g., without limitation; long delay trip; short delay trip). The first indicator 214a in the example interface panel 206 shown in FIG. 3 corresponds to a long delay trip ("L") and the second indicator 214b corresponds to a short delay trip ("S"). However, it will be appreciated by one having ordinary skill in the art that the number of indicators 214 corresponding to causes of trips and the particular corresponding causes of trips can be varied without departing from the scope of the disclosed concept.

Figure 5:
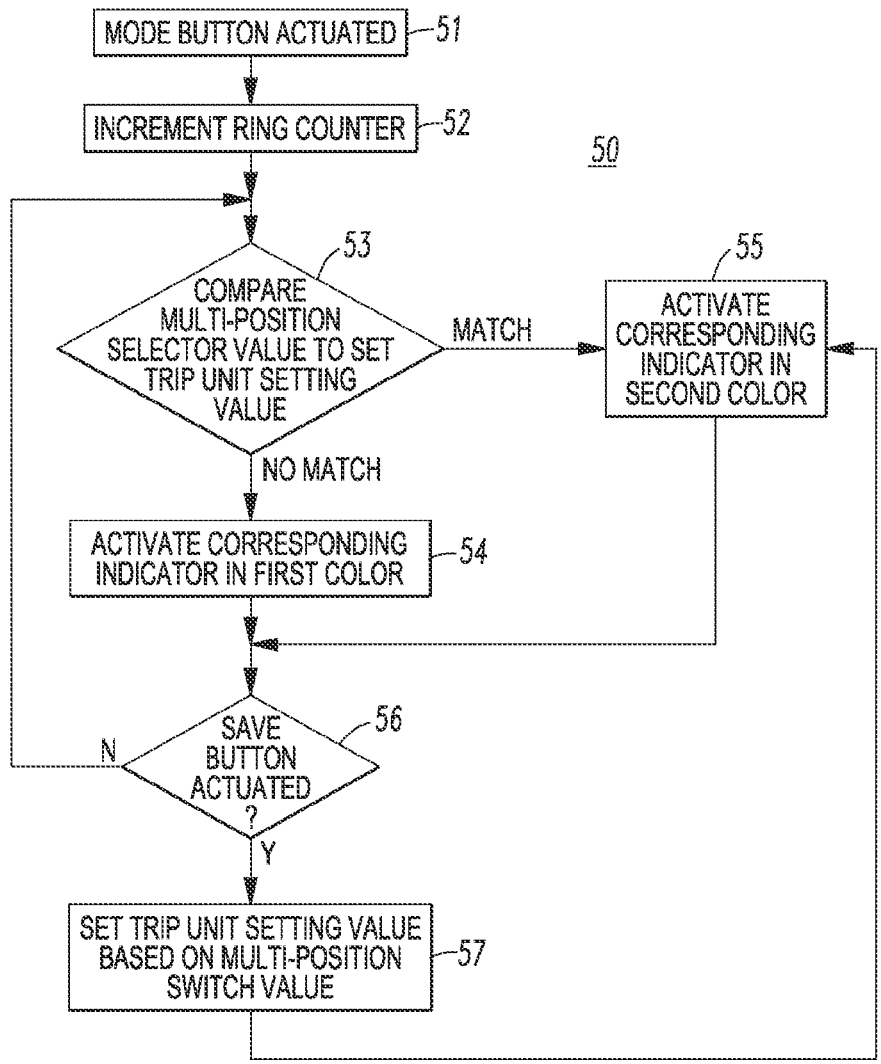
FIG. 5 is a flowchart of a method of setting trip unit settings in accordance with an embodiment of the disclosed concept.
Figure 6:
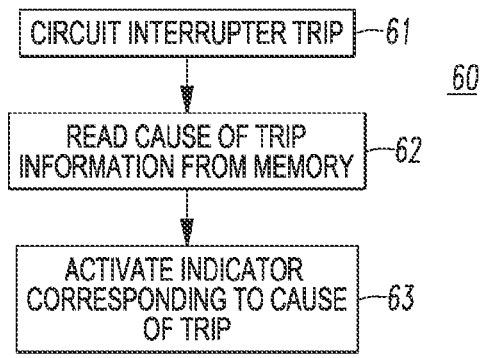
FIG. 6 is a flowchart of a method of indicating a cause of trip in accordance with an embodiment of the disclosed concept.

FIGS. 5 and 6 show respective routines executed by the processor 202 of FIG. 2. The trip unit setting routine 50 of FIG. 5 starts when the mode button 208 is actuated at 51 (e.g., without limitation, pressed). In response, the processor 202 increments a ring counter at 52. Each value of the ring counter corresponds to one trip unit setting as well as one of the indicators 214. Hereinafter, the trip unit setting corresponding to the current ring counter value will be referred to as the "active trip unit setting". Table 2 shows an example of ring counter values and their corresponding trip unit settings and indicators 214.

TABLE 2

| Ring Counter Value | Trip Unit Setting | Indicator |
|---|---|---|
| 0 | None | None |
| 1 | Ir | First indicator 214a |
| 2 | SDPU | Second indicator 214b |
| 3 | SD Time | Third indicator 214c |

At 53, the processor routine 50 compares the value of the active trip unit setting corresponding to the position of the multi-position selector 212 with the currently set value of the active trip unit setting to determine whether they match. Using the values provided in Tables 1 and 2 as an example, when the ring counter value is "2" and the position of the multi-position selector 212 is "4", the active trip unit setting is the SDPU setting and the value of the SDPU setting corresponding to the position of the multi-position selector 212 is 6×. If the currently set value of SDPU is not 6×, the routine 50 proceeds to 54, but if the currently set value of SDPU is 6×, then the routine 50 proceeds to 55.

At 54, the indicator 214 corresponding to the ring counter value is activated in a first color (e.g., without limitation, amber) indicating that the currently set value of the active trip unit setting and the value of the active trip unit setting corresponding to the current position of the multi-position selector 212 do not match. On the other hand, at 55, the indicator 214 corresponding to the ring counter value is activated in a second different color (e.g., without limitation, green) indicating that the currently set value of the active trip unit setting and the value of the active trip unit setting corresponding to the current position of the multi-position selector 212 match.

After 54 or 55, in response to the save button 210 being actuated at 56 (e.g., without limitation, pressed), the routine proceeds to 57. At 57, the active trip unit setting of the electronic trip unit 200 is set to the value of the active trip unit setting corresponding to the position of the multi-position selector 212, and the indicator 214 corresponding to the ring counter value is activated in the second color at 55. Using the values provided in Tables 1 and 2 as an example again, if the save button 210 is actuated when the active trip unit setting is the SDPU setting and the position of the multi-position selector 212 is "4", 6× will be set as the SDPU setting of the electronic trip unit 200.

While indicators 214 capable of activating in first or second colors are disclosed, it will also be appreciated that indicators 214 capable of activating in a single color may be used without departing from the scope of the disclosed concept. If single color indicators 214 are used, then steps 53 and 55 may be omitted from the trip unit setting routine 50.

FIG. 6 shows a cause of trip display routine 60 of the processor 212. The cause of trip display routine 60 begins when the circuit interrupter trips at 61 (e.g., without limitation, when the electronic trip unit 200 initiates a trip). At 62, the cause of trip information 62 is read from memory 204. Finally, at 63, the indicator 214 corresponding to the cause of trip is activated. Using the interface panel 206 as an example, if the cause of trip is a long delay trip ("L"), then indicator 214a is activated to indicate the cause of trip.

The disclosed electronic trip unit 200 facilitates setting multiple trip unit settings with a single multi-position selector 212. The disclosed electronic trip unit 200 also facilitates indicating a cause of trip without using an external module to read the cause of trip information.

Although separable contacts 102 are disclosed, suitable solid state separable contacts can be employed. For example, the disclosed circuit interrupter 100 includes a suitable circuit interrupter mechanism, such as the separable contacts 102 that are opened and closed by the operating mechanism 104, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electronic trip unit having a plurality of trip unit settings, the electronic trip unit comprising:
   a first input member;
   a second input member;
   a multi-position selector configured to select one of a plurality of positions corresponding to values of the trip unit settings;
   a plurality of indicators each corresponding to one of the trip unit settings; and
   a processor having a routine,
   wherein the routine of the processor is structured to, in response to actuation of the first input member, increment a ring counter value and selectively activate one of the indicators corresponding to the ring counter value; and
   wherein the routine of the processor is further structured to, in response to actuation of the second input member, set a value of the trip unit setting corresponding to the activated indicator based on the selected position of the multi-position selector.

2. The electronic trip unit of claim 1, wherein one or more of the indicators each correspond to one of a number of causes of trip; and wherein the routine of the processor is further structured to, in response to a trip, selectively activate one of the indicators corresponding to the cause of trip.

3. The electronic trip unit of claim 2, wherein at least one of the indicators corresponds to one of the trip unit settings and one of the causes of trip.

4. The electronic trip unit of claim 2, wherein said number of causes of trip includes at least one of a short delay trip and a long delay trip.

5. The electronic trip unit of claim 1, wherein the multi-position selector is a rotary dial switch.

6. The electronic trip unit of claim 1, wherein at least one of the indicators is a light emitting diode.

7. The electronic trip unit of claim 1, wherein each of the indicators is configured to activate in a first color or a different second color, wherein the routine of the processor is further structured to selectively activate one of the indicators corresponding to the ring counter value in the first color when the set value of the trip unit setting corresponding to the activated indicator does not match the value corresponding to the selected position of the multi-position selector; and wherein the routine of the processor is further structured to selectively activate one of the indicators corresponding to the ring counter value in the second color when the set value of the trip unit setting corresponding to the activated indicator matches the value corresponding to the selected position of the multi-position selector.

8. The electronic trip unit of claim 1, wherein the trip unit settings include at least one of a full load ampere rating, a short delay pickup, and a short delay time.

9. A circuit interrupter configured to protect a power circuit, the circuit interrupter comprising:
   separable contacts;
   an operating mechanism configured to open and close said separable contacts;
   an electronic trip unit cooperating with said operating mechanism to trip open said separable contacts and having a plurality of trip unit settings, the electronic trip unit comprising:
   a first input member;
   a second input member;
   a multi-position selector configured to select one of a plurality of positions corresponding to values of the trip unit settings;
   a plurality of indicators each corresponding to one of the trip unit settings; and
   a processor having a routine,
   wherein the routine of the processor is structured to, in response to actuation of the first input member, increment a ring counter value and selectively activate one of the indicators corresponding to the ring counter value; and
   wherein the routine of the processor is further structured to, in response to actuation of the second input member, set a value of the trip unit setting corresponding to the activated indicator based on the selected position of the multi-position selector.

10. The circuit interrupter of claim 9, wherein one or more of the indicators each correspond to one of a number of causes of trip; and wherein the routine of the processor is further structured to, in response to a trip, selectively activate the one of the indicators corresponding to the cause of trip.

11. The circuit interrupter of claim 10, wherein at least one of the indicators corresponds to one of the trip unit settings and one of the causes of trip.

12. The circuit interrupter of claim 10, wherein said number of causes of trip includes at least one of a short delay trip and a long delay trip.

13. The circuit interrupter of claim 9, wherein the multi-position selector is a rotary dial switch.

14. The circuit interrupter of claim 9, wherein at least one of the indicators is a light emitting diode.

15. The circuit interrupter of claim 9, wherein each of the indicators is configured to activate in a first color or a different second color; wherein the routine of the processor is further structured to selectively activate one of the indicators corresponding to the ring counter value in the first color when the set value of the trip unit setting corresponding to the activated indicator does not match the value corresponding to the selected position of the multi-position selector; and wherein the routine of the processor is further structured to selectively activate one of the indicators corresponding to the ring counter value in the second color when the set value of the trip unit setting corresponding to the activated indicator matches the value corresponding to the selected position of the multi-position selector.

16. The circuit interrupter of claim 9, wherein the trip unit settings include at least one of a full load ampere rating, a short delay pickup, and a short delay time.

17. A method of setting trip unit settings of an electronic trip unit having a first input member, a second member, a multi-position selector configured to select one of a plurality of positions corresponding to values of trip unit settings, and a plurality of indicators each corresponding to one of the trip unit settings, the method comprising:
   in response to actuation of the first input member, incrementing a ring counter value and selectively activating one of the indicators corresponding to the ring counter value; and
   in response to actuation of the second input member, setting a value of the trip unit setting corresponding to the activated indicator based on the selected position of the multi-position selector.

18. The method of claim 17, wherein one or more of the indicators each correspond to one of a number of causes of trip; and wherein the method further comprises:
   in response to a trip, activating one of the indicators corresponding to the cause of trip.

19. The method of claim 18, wherein at least one of the indicators corresponds to one of the trip unit settings and one of the causes of trip.

20. The method of claim 18, wherein said number of causes of trip includes at least one of a short delay trip and a long delay trip.

21. The method of claim 17, wherein the multi-position selector is a rotary dial switch.

22. The method of claim 17, wherein at least one of the indicators is a light emitting diode.

23. The method of claim 17, wherein each of the indicators is configured to activate in a first color or a different second color, and wherein said selectively activating one of the indicators corresponding to the ring counter value further comprises:
   selectively activating one of the indicators corresponding to the ring counter value in the first color when the set value of the trip unit setting corresponding to the activated indicator does not match the value corresponding to the selected position of the multi-position selector; and
   selectively activating one of the indicators corresponding to the ring counter value in the second color when the set value of the trip unit setting corresponding to the activated indicator matches the value corresponding to the selected position of the multi-position selector.

24. The method of claim 17, wherein the trip unit settings include at least one of a full load ampere rating, a short delay pickup, and a short delay time.

* * * * *